United States Patent [19]
Warner

[11] Patent Number: 5,541,858
[45] Date of Patent: Jul. 30, 1996

[54] TRIP LOG ODOMETER

[76] Inventor: Ralph C. Warner, 3384 E. Marinda Way, Salt Lake City, Utah 84121

[21] Appl. No.: 172,562

[22] Filed: Dec. 21, 1993

Related U.S. Application Data

[63] Continuation-in-part of Ser. No. 742,312, Aug. 8, 1991, abandoned.

[51] Int. Cl.$^6$ .................................................. G01C 22/00
[52] U.S. Cl. ...................... 364/561; 235/97; 364/424.01; 340/438
[58] Field of Search .................... 364/561, 424.01, 364/424.04, 550; 235/95 R, 97; 340/425.5, 435, 438, 459, 461, 462

[56] References Cited

U.S. PATENT DOCUMENTS

| | | | |
|---|---|---|---|
| 4,188,618 | 2/1980 | Weisbart | 364/424.04 |
| 4,258,421 | 3/1981 | Juhasz et al. | 364/424.04 |
| 4,371,934 | 2/1983 | Wahl et al. | 364/444 X |
| 4,613,939 | 9/1986 | Paine | 364/424.04 |
| 4,685,061 | 8/1987 | Whitaker | 364/424.04 |
| 4,710,888 | 12/1987 | Burke et al. | 364/561 |
| 4,740,905 | 4/1988 | Murakami et al. | 364/424.01 |
| 4,803,646 | 2/1989 | Burke et al. | 364/561 |
| 5,046,007 | 9/1991 | McCrery et al. | 364/424.04 |
| 5,337,236 | 8/1994 | Fogg et al. | 364/424.04 |

*Primary Examiner*—Ellis B. Ramirez
*Assistant Examiner*—Edward Pipala
*Attorney, Agent, or Firm*—Thorpe North & Western

[57] ABSTRACT

A system for storing beginning and ending odometer readings of a plurality of individual trips made by a vehicle. The odometer readings for each trip are stored individually for future retrieval and use. The system can be directly connected to an odometer device included on the vehicle, or odometer information can be manually input by the vehicle operator. The date and other data such as the vehicle and operator identify, trip purpose, and customer identification codes, are stored for each trip. A data I/O port is provided to allow direct transfer of data from the system to a central computer where the data can be used by appropriate computer programs. The distance traveled during each trip can be calculated by a central computer, or the system can be programmed to calculate the trip distance. The apparatus is accommodated in a compact housing which slides into a cradle mounted inside the vehicle for convenient relocation from one vehicle to another or to a computer for data transfer. The apparatus is powered by the vehicle power source. The present invention provides an accurate and convenient system for logging the information associated with each trip made by a vehicle so that accurate records can be easily kept on the use of a vehicle.

23 Claims, 5 Drawing Sheets

TRIP LOG ODOMETER

BACKGROUND

This is a continuation-in-part of U.S. patent application 07/742,312 filed on Aug. 8, 1991, now abandoned, titled Trip Log Odometer.

1. The Field of the Invention

This invention relates to devices used to record for later examination beginning and ending readings of an odometer of a vehicle, or the distances associated therewith.

2. The Prior Art

As the cost of operating vehicles such as passenger cars and freight hauling trucks increases, there has arisen a greater need to accurately determine the distance which a vehicle has been driven and the purpose for which the vehicle was driven. For example, sales people, delivery people, and those who provide professional services in many cases regularly make trips in a vehicle to conduct their business.

Strong financial incentives exist to keep an accurate record of the use of a vehicle. In the case of a sales person, favorable tax treatment is received only if the business use of a vehicle is properly documented.

While business use of a vehicle can be documented using a notebook and handwritten entries, human nature being what it is, many people loath making entries in a written log every time they get into and out of their vehicle. Moreover, one trip from a first origination point to a first destination point may be for a first business purpose, a second trip from a second origination point to a second destination point may be for personal purposes, and a third trip may be for another business purpose, some or all of which might need to be separately identified and recorded.

Even if a vehicle operator properly logs all trip entries, there invariably also exists the time consuming task of inputting the same information which was manually logged by the vehicle operator into a computer based accounting or bookkeeping system. This adds to the cost of accounting for the distances traveled by a vehicle and also presents an opportunity for errors to be introduced into the process. Disadvantageously, if tax benefits are taken for business use on a vehicle, which are later disallowed due to lack of proper records being kept, not only will back taxes be owed, but generally interest, and perhaps a penalty, will be added to the back taxes. Thus, it would be an advance in the art to provide a system to make logging the distances covered in a plurality of trips made in a vehicle more convenient and accurate.

Previous attempts have been made to provide a device which simplifies the process of logging trip entries. For example, U.S. Pat. No. 5,046,007 (issued on Sep. 3, 1991 to McCrery et al.) discloses a MOTOR VEHICLE DATA COLLECTION DEVICE which is responsive to the drive train of a vehicle to thereby keep track of the distance travelled by the vehicle. The McCrery et al. device provides a number of conveniences for the user. The device collects travel-related data other than mileage travelled, and all information collected can be downloaded into an external microcomputer.

However, the McCrery et al. device and other prior art devices lack certain features needed to make them so convenient that a user will consistently use them without undue time consumption and/or confusion. For example, McCrery et al. teach a device which automatically records all trips taken, regardless of purpose. The activating and deactivating of the vehicle engine is the primary criteria for determining the beginning and end of a trip (see col. 1, lines 59–61). If no trip code is entered, a default "null value" trip code is entered to identify the trip (see col. 9, lines 28–29). These combinations necessarily result in mandatory logging of data every time the vehicle is used, resulting in a mixture of useful and unwanted data. Further, a single trip having multiple trip segments will show up in the data storage as multiple entries, when only one entry is needed. This results in a waste of storage space.

McCrery et al. also fails to teach error checking means to determine whether an odometer reading input comprises an erroneous entry in the form of a numerically lower value than an odometer reading previously entered. Such erroneous entries can occur by using the device with a number of different vehicles, for example, and result in erroneous records having no value as tax and business records. Also needed in such devices is a feature which monitors available memory capacity and informs the operator as to how many more trips can be recorded in the device. Otherwise, an operator may be hundreds of miles away from the host computer when the memory, without warning, becomes used up. The operator would need to keep written records for the rest of the trip, or worse still, might lose valuable trip data by making manual errors or by failing to recognize the memory overload. Another needed feature lacking in the McCrery et al. device is a monitoring function which reminds the operator to perform routine maintenance and other tasks. Further, sophisticated devices such as that taught by McCrery et al. require rather large keypads and other control structure.

BRIEF SUMMARY AND OBJECTS OF THE INVENTION

In view of the above described state of the art, the present invention seeks to realize the following objects and advantages.

It is a primary object of the present invention to provide a system for logging vehicle trips which is more convenient and more accurate than previously available systems and methods.

It is also an object of the present invention to provide a system for logging vehicle trips which manually logs the odometer readings associated with the origination points and destination points of such trips.

It is a further object of the present invention to provide a system for logging vehicle trips which can readily transfer the recorded trip log information to another computer in a format where it can be used thereby.

It is yet another object of the present invention to provide a system for logging vehicle trips which can transfer data to a compact, portable printing device to create printed reports in accordance with a user's needs.

It is still another object of the present invention to provide a system for logging vehicle trips which can be conveniently removed from a vehicle and replaced in the same vehicle or moved to a different vehicle.

It is yet another object of the present invention, in accordance with one aspect thereof, to provide a system for logging vehicle trips which prompts the operator for, and allows convenient input of, codes identifying the operator of the vehicle and/or the purpose of the trip, with each trip logged.

It is another object of the present invention, in accordance with one aspect thereof, to provide a system for logging vehicle trips which is responsive to a signal produced by a user key pad command for preventing the storage means from storing data associated with a particular trip.

It is a further object of the present invention, in accordance with one aspect thereof, to provide a system for logging vehicle trips which is lightweight and capable of being housed in a relatively small housing.

It is an additional object of the present invention, in accordance with one aspect thereof, to provide a system for logging vehicle trips which alerts the operator when the amount of data stored approaches the capacity of a storage device of the invention.

It is another object of the present invention, in accordance with one aspect thereof, to provide a system for logging vehicle trips which provides an audible/visual signal to the operator upon of the occurrence of a predetermined date or odometer reading as a reminder to the operator to perform certain tasks.

These and other objects and advantages of the invention will become more fully apparent from the description and claims which follow, or may be learned by the practice of the invention.

The present invention provides a system for storing odometer readings associated with the origination and destination points of a plurality of trips, the odometer readings for each trip being stored individually in memory so they can later be retrieved and used to document the use of the vehicle. Along with the odometer readings, the date of the trip, the purpose of the trip, the operator identity, a customer identification code, and other data can also be stored. Such data can be entered for storing in memory either manually, or automatically (by default) if the operator fails to enter the data. An odometer input means receives information from manual input by the vehicle operator. Alternatively, the system can be adapted to receive odometer readings and other data automatically from an odometer device connected to the vehicle, and automatically compute therefrom a trip distance for each trip.

In accordance with one aspect of the invention, an error checking means is also included to determine whether an odometer reading input comprises an erroneous entry in the form of a numerically lower value than an odometer reading previously entered. In such cases the operator is prompted to replace the erroneous entry.

A clock means is also included so that a date can be associated with the odometer readings for each trip and, if desired, a time of day. The preferred embodiments of the present invention also include a transfer means for conveying the stored odometer readings, the dates, and other data, associated therewith, to an external data utilizing device such as a general purpose computer. A display means is also included to present information to the operator of the vehicle.

A housing means is also provided and removably fits within a cradle, or a means for releasably holding the housing. The cradle is attached to the vehicle, preferably at a position inside the operator's compartment of the vehicle. When held in the cradle, the preferred embodiments of the trip log odometer are powered by the vehicle power source via a connector. A power supply means, including a self-contained DC power source such as a battery, is provided in the apparatus to provide electrical power to the apparatus so that selected functions of the apparatus are preserved when the apparatus is removed from the cradle.

The present invention provides an accurate and convenient system for logging the beginning and ending odometer readings of each trip made by a vehicle so that accurate records can be easily kept on the use of a vehicle. The present invention also allows the convenient transfer of the odometer readings to a central computer so that trip distance values can be calculated and used by, for example, an accounting or booking computer program.

BRIEF DESCRIPTION OF THE DRAWINGS

In order to better appreciate how the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Reference will now be made to the drawings wherein like structures will be provided with like reference designations.

Figure 1:
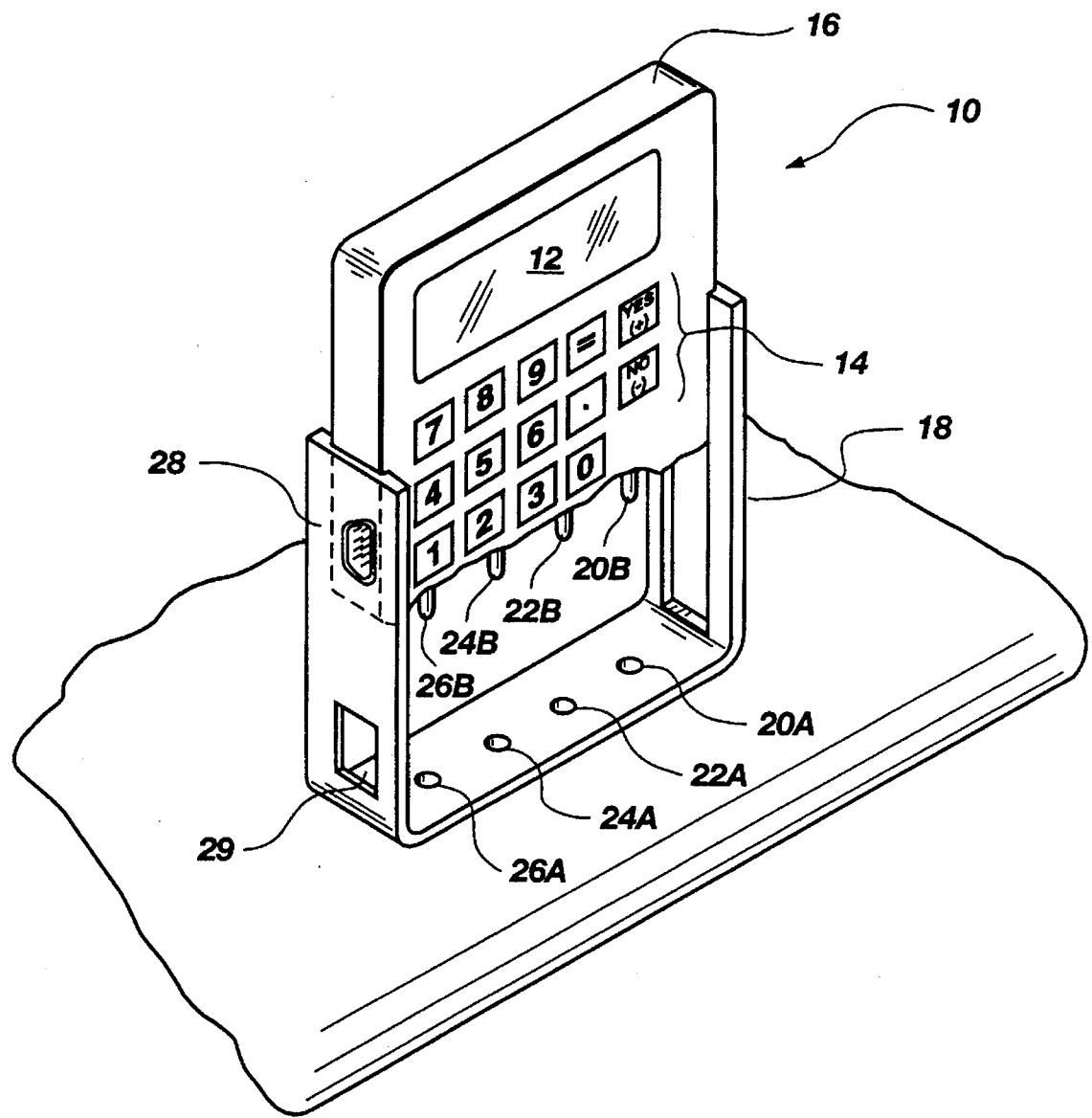
FIG. 1 is a perspective view of a presently preferred embodiment of the trip log odometer of the present invention.

FIG. 1 provides a perspective view of a presently preferred embodiment of the trip log odometer, generally designated at 10, of the present invention. As mentioned, devices which have been previously used to log miles traveled on a vehicle have lacked one or more needed features to make them so convenient and easy to use that operators of a vehicle will completely implement them. The embodiment of the present invention represented in FIG. 1 achieves this object as will be fully appreciated shortly.

The presently preferred embodiment 10 includes a housing 16 which contains many of the components used to carry out the present invention. Represented in FIG. 1 is a key pad, indicated at bracket 14, and a display 12. The key pad 14 and the display 12 allow the operator of the vehicle to interact with, and input information to, the trip log odometer 10. The structure which are used for the key pad 14 and the display 12 can be selected from components well known in the art.

Also represented in FIG. 1 is a cradle 18 which is configured to securely receive and hold the housing 16. The cradle 18 is attached to a vehicle, preferably in the interior of the operator's compartment. For example, as shown in FIG. 1, the cradle 18 can be conveniently attached to the dashboard of a vehicle. The cradle 18 is the presently preferred example of a means for releasably holding the housing in accordance with the present invention. Structures other than those specifically illustrated herein, and which are within the ability of those skilled in the art to fabricate, can also function as the means for releasably holding within the scope of the present invention.

The cradle 18 is provided with a plurality of electrical contacts, (20A, 22A, 24A, and 26A) which mate with, and make a secure electrical connection to, corresponding contacts (20B, 22B, 24B, and 26B) provided on the housing 16. It will be appreciated that those skilled in the art can substitute one or more connectors, which are known in the art, for the contacts (20A-B, 22A-B, 24A-B, and 26A-B). Furthermore, other arrangements, which are now known in the art or which become known in the future, such as optical or wireless communication arrangements, can also be used within the scope of the present invention.

Preferably, the contacts 20A-B and 22A-B are used to transfer data from sensor units (not represented in FIG. 1) located in a vehicle. Contacts 24A-B and 26A-B are preferably used to provide a secure ground connection between the trip log odometer and the vehicle as well as provide a connection between the DC power source provided on the vehicle and the trip log odometer. A data transfer port 28 is also provided to allow data transfer between the trip log odometer 10 and another device. A passageway 29 is provided in the cradle 18 to allow a cable and/or plug to pass therethrough and make connection to the data transfer port.

The housing should be small and light weight so that it can easily be carried by the operator of the vehicle. The described embodiment preferably includes a housing 16 with dimensions less than about six inches by about four inches by about two inches, and most preferably not more than about three and one-half inches by two inches by three-quarters inch.

The cradle 18 is constructed so that the trip log odometer is securely held therein but can also be easily removed by an operator. Significantly, the trip log odometer of the present invention can be removed from one vehicle and replaced in another vehicle equipped with a similar or identical cradle 18. Moreover, the easy removal of the trip log odometer 10 allows it to be carried to the desk top computer used to perform general accounting and bookkeeping tasks of the business, and allows the information stored in the trip log odometer to be easily transferred to the desk top, or other, data utilizing device. It is an important feature of the present invention to allow data to be transferred from the trip log odometer 10 to any type of data utilizing device, usually a general purpose computer, which is used to manipulate and store data. It will be appreciated that those skilled in the art will be able to select or devise software used with the data utilizing device to employ the data transferred from the trip log odometer.

Figure 2:
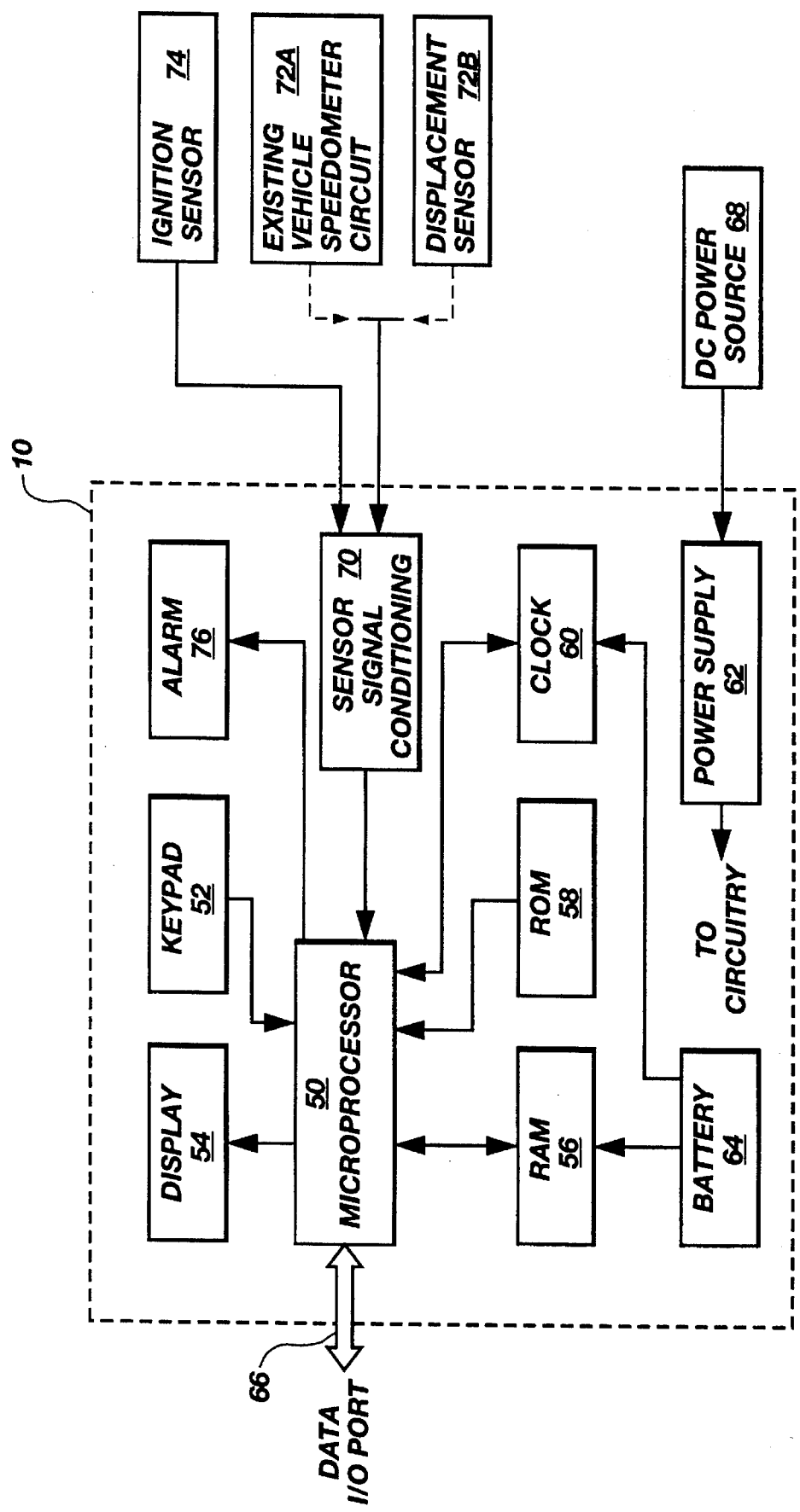
FIG. 2 is a block diagram of a presently preferred embodiment of the trip log odometer of the present invention.

Provided in FIG. 2 is a block diagram showing the presently preferred principal components of the trip log odometer. It is to be understood, however, that other arrangements and components can also be used to carry out the present invention.

It is preferred that the trip log odometer 10 log beginning and ending odometer readings for downloading to a host computer which calculates the trip distance, as more fully explained below. However, the trip log odometer 10 contains its own microprocessor 50 which can be used for this purpose. The microprocessor 50 can desirably be one available from Intel (for example, one from the 8031 or 8051 families) or Motorola (for example, one from the 6805 family). It will be appreciated that other arrangements and components can be used to make calculations. Also represented in FIG. 2 is a ROM (Read Only Memory) chip 58 which functions to hold the program code utilized by the microprocessor 50. Appropriate programming code can readily be provided by those skilled in the pertinent arts.

A RAM (Random Access Memory) chip 56 is also included in the trip log odometer of the present invention. The RAM 56 functions as the presently preferred example of a storage means for storing beginning and ending odometer readings, and/or a first trip distance value. As the odometer readings are input, they are stored in the RAM chip 56. In an embodiment which utilizes the microprocessor to calculate the trip distance value, as will be more fully explained shortly, the trip distance values are also stored in the RAM 56. It will be understood by those skilled in the art that many other devices and arrangements can be used to store the trip distance values in accordance with the present invention.

Also represented in FIG. 2 is a data I/O port 66. The data I/O port 66 is preferably a port conforming to the well known RS-232 protocol which is commonly used to convey information between data utilizing devices. The described data I/O port is merely one preferred example of a transfer means for conveying odometer readings and/or trip distance values and other data to a data utilizing device such as a computer. Through the data I/O port 66, the odometer readings are conveyed to an external device via the microprocessor 50.

Still referring to FIG. 2, a clock 60 is used to provide at least date information, and, if desired, time information, to the microprocessor 50. Any number of commercially available devices can function as the clock 60. In some instances, a microprocessor 50 can be selected which includes an internal clock as well as RAM and ROM, and even any other function described herein. The clock 60 is the presently preferred example of a clock means for associating a date and a time of day, if desired, with the odometer readings or trip distance values stored in the RAM 56.

In the described trip log odometer embodiment 10, both the clock 60 and the RAM 56 are connected to a battery 64, functioning as a self-contained DC power source, which provides battery backup to maintain these functions when the trip log odometer 10 is not connected to the DC power source 68. The DC power source 68 is preferably the vehicle DC source or an external power supply located at the desk top, or other computer which receives that data stored in the RAM 56. It will be understood in the art that the functions of RAM 56 could be carried out within the scope of the present invention using devices which do not require battery back-up.

A power supply 62 preferably includes a DC to DC converter, such as is known in the art, to provide DC power to the components of the trip log odometer 10. The power supply 62 functions as the preferred example of a power supply means in accordance with the present invention.

Also represented in FIG. 2 is a sensor signal conditioning circuit 70. The sensor signal conditioning circuit 70 receives an electrical signal from another device which senses the speed of the vehicle through one of any number of known techniques. It will be appreciated that the precise functioning of the sensor signal conditioning circuit 70 will be dependent upon the type of signal input to it.

One alternative for sensing vehicle speed is to utilize the signal available from the existing vehicle speedometer circuit 72A. Many vehicles which utilize an electrical, rather than a mechanical, speedometer generate an electrical signal which represents the distance traveled, or being traveled, by the vehicle. U.S. Pat. Nos. 4,710,888 and 4,803,646, which are now incorporated by reference, are exemplary of an electronic odometer now available in the art.

Alternatively, a dedicated displacement sensor 72B, utilizing any one of a number of technologies, can be installed on the vehicle to sense the distance being traveled. The displacement sensor 72B can be fitted to an existing mechanical speedometer arrangement or to other vehicle components in order to provide an appropriate signal to the sensor signal conditioning circuit 70. In some cases, the signal output from the displacement sensor 72B or the existing vehicle speedometer circuit 72A can be directly used by the microprocessor 50 but it may still be desirable to provide some conditioning, such as filtering, to prevent transients and unwanted electrical noise from interfering with the proper operation of the trip log odometer 10. The displacement sensor 72B is one preferred arrangement for carrying out the means for sensing the rate of revolutions of the drive train of the vehicle.

The sensor signal conditioning circuit 70, the microprocessor 50, and the connection to the existing vehicle speedometer circuit 72A or the displacement sensor 72B function as examples of an odometer input means for receiving information from the odometer of the vehicle in accordance with the present invention. Importantly, other structures, as will be described shortly, can also function as the odometer input means of the present invention.

In the embodiment represented in FIG. 2, an ignition sensor 74 is also provided. The ignition sensor 74 is operatively connected to the vehicle ignition circuit for sensing a voltage rise upon activation of the vehicle ignition. The signal from the ignition sensor 74 allows the trip log odometer 10 to determine when the vehicle ignition switch is turned on or off, i.e., to determine when a trip is begun or ended, respectively. Thus, the microprocessor 50 can be programmed to consider that each time the vehicle ignition switch is turned on a new trip is started. The operator can be prompted to choose whether to record data for the trip, or the microprocessor 50 can be programmed to receive a prompt from the ignition sensor 74 and automatically enter "default" preliminary trip data such as the trip date, trip purpose, a default operator identity and so forth. This could be programmably arranged by one of ordinary skill in the art to occur either after a certain amount of time has lapsed during a trip, after a certain distance has been traveled, after the ignition has been turned off for a certain amount of time, or at some other time. Similarly, each time the vehicle ignition switch is turned off, a trip is completed and the odometer readings and/or the trip distance value should be stored in RAM 56.

Alternatively, the operator can be given the choice of manually entering the preliminary trip data. The trip log odometer 10 can use the ignition on and off occurrences to prompt the operator, via a display 54 or an audible alarm 76, or both, to enter when a trip has begun and ended, the date of the trip, the purpose of the trip, the operator identity, a customer identification code and so forth. In this alternative, the keypad 52 is functioning as a data input means of the present invention, which stores the data received in RAM 56. The ignition sensor 74, and the structures associated therewith, are the presently preferred example of apparatus for triggering an alarm when the vehicle ignition switch is actuated.

The embodiment of the trip log odometer 10 can be arranged so that the connection to the existing vehicle speedometer circuit 72A or to the displacement sensor 72B is omitted. The operator, preferably upon being prompted when the vehicle ignition is turned on, decides whether the trip should be recorded or not and enters an appropriate command. This is an important convenience for the user. It will be appreciated that the user may not wish to record all of the vehicle mileage; it may be most convenient to simply let non-business or other vehicle use go unrecorded. If the user wishes to record the trip, the user enters a beginning odometer value into the trip log odometer 10 and upon being prompted when the vehicle ignition is turned off, enters an ending odometer value into the trip log odometer 10. The microprocessor 50 then stores this data in RAM 56 for future transfer or, in the alternative, calculates the trip distance values and stores the values in the RAM 56.

A key pad 52 is provided to allow the operator to manually input the odometer values. When the odometer values are being manually input, the key pad 52 is functioning as the odometer input means of the present invention. The key pad 52 can also be adapted to comprise a scrolling means for allowing an operator to selectively increase and decrease the odometer input information in one-mile increments by pressing either the (+) or (−) button as shown at bracket 14 in FIGS. 2 and 3, or some other button. It will be appreciated that even other structures not explicitly described can function as the odometer input means or the scrolling means of the present invention.

A further convenience for the user includes the data management scheme of the trip log odometer 10. Some business trips involve many different days and trip segments. The prior art devices record a separate trip each time the vehicle is turned off. It will be appreciated that this method requires a number of separate data strings and user interactions for a single, multi-day trip. This can be laborious and time consuming and introduces unnecessary complexity and opportunity for error. When the ignition is deactivated, the odometer 10 prompts the operator to close the trip. At this point, the operator may enter an ending odometer reading to close the trip, or not enter an odometer reading if the trip is to be continued. In the latter case, the user merely refrains from closing the trip until all trip segments are complete. Only one data string is stored for such trips, increasing the memory capacity and reducing potential confusion and error in the records and/or in the interpretation thereof.

Still another convenience is the memory management feature of the trip log odometer 10. Each trip is stored in memory as a data string. In the preferred, manually operable embodiment, each data string preferably includes the following:

DATE, START MILEAGE, END MILEAGE, TRIP CODE, DRIVER CODE The memory can store a certain number of data strings. The trip log odometer 10 displays to the user the number of trips left to store, and can also display the number of trips stored. Without this feature, a user may use up all available memory without warning while on the road, miles away from the downloading computer. This can result in a loss of data or require the user to keep interim written records. The display of trips left to store reminds the user to plan a convenient opportunity for downloading the stored data to avoid the problems described.

Figure 3:
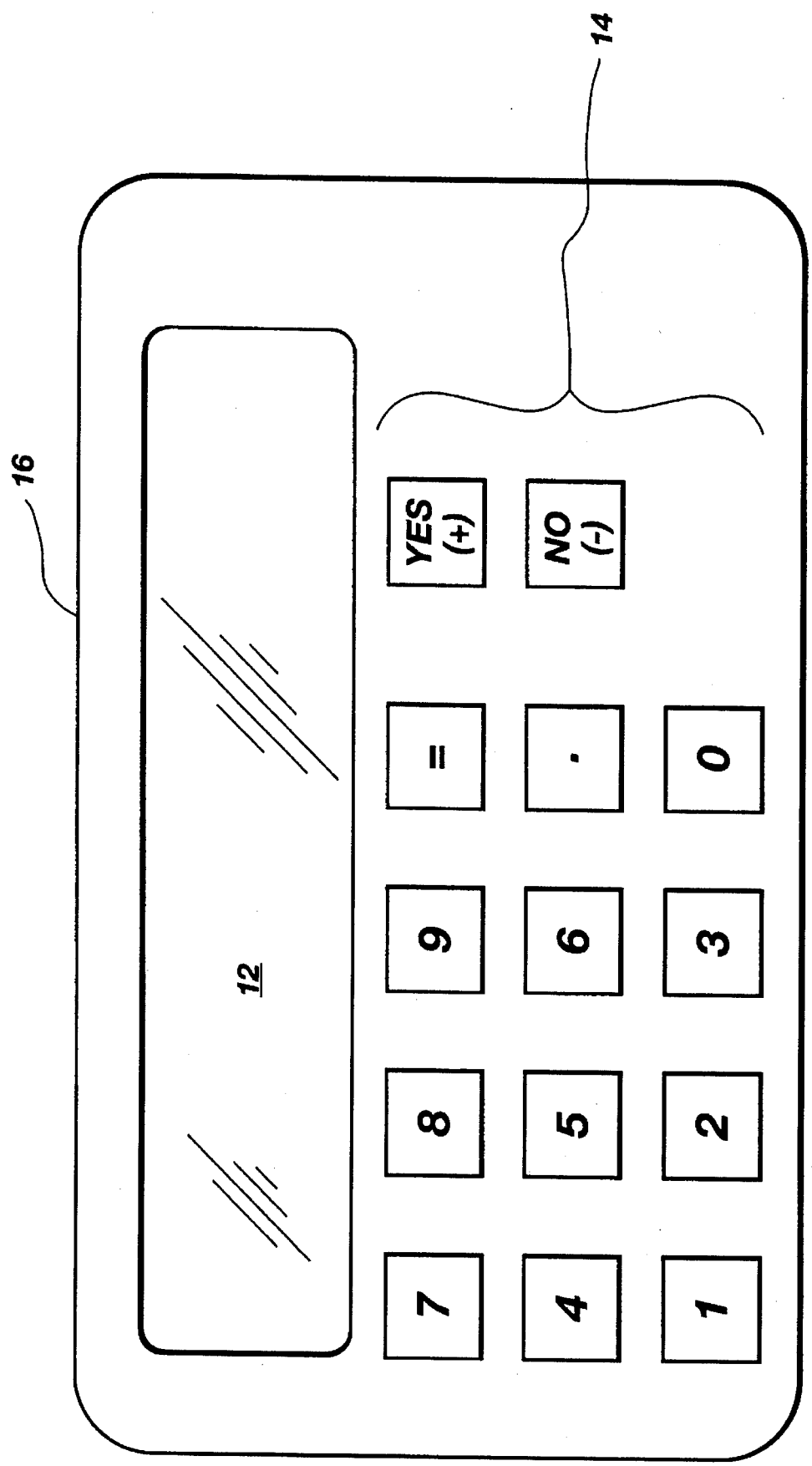
FIG. 3 is a diagram depicting the operator interface structures of a presently preferred embodiment of the present invention.

Reference will now be made to FIG. 3 which is a diagram depicting one possible embodiment of the operator interface structures of the trip log odometer 10 of the present invention. In operation, when the vehicle ignition is turned on, the trip log odometer 10 emits an audible alarm, or a visual signal in the display 12, to alert the operator to command whether to begin or continue a trip or not to record the trip. If the user decides to begin or continue a trip, the user must either enter or check the beginning odometer reading as shown on the display 12. The system 10 offers the previously entered ending odometer reading as a candidate for the beginning odometer reading of a new trip. If the odometer value shown in the display 12 is correct, the operator merely presses the "Yes" key and proceeds with the trip. If the odometer display is incorrect, the operator can use the key pad 14 to enter the correct value and, preferably, the trip log odometer will sound a short beep to have the operator again check the value to ensure that it is correct and wait for the operator to confirm that the value is correct.

The microprocessor 50 can be programmed to compare a presently entered odometer reading input with a previously entered odometer reading input. If the presently entered reading has a lower numerical value than the previously entered reading, the microprocessor 50 will actuate a visual or audible signal via the display 54 or the audible alarm 76, or both, to prompt the operator to replace the erroneous entry.

The beginning and ending odometer readings for each trip are transferred via the data transfer port 28 from the removable apparatus to an external computer or other data utilizing device. The external computer then manipulates the data as desired by calculating the trip distance, billing the trip to a certain account, and so forth. In an alternative embodiment, the trip distance value for each trip can automatically be calculated by the microprocessor 50 and stored in RAM 56 each time the vehicle ignition is turned off. Alternatively, the operator can be prompted each time the vehicle ignition is turned off and the trip distance value calculated and stored if directed by the operator. At a minimum, the current date, provided by the clock 60 in FIG. 2, is stored with either the beginning and ending odometer readings of a trip, or the trip distance value. Other arrangements can also be used within the scope of the present invention.

It is also desirable that additional information be stored with each trip entry. For example, it is most desirable to store with each trip entry, alpha and/or numeric character strings representing the identity of a vehicle operator, representing a purpose of the trip, or representing a customer.

It is also within the scope of the present invention to program the microprocessor 50 to include functions such as: prompting the operator with an audible alarm prompt or a visual display prompt at preselected dates, times of day or odometer readings to transfer the trip data to another computer, perform routine maintenance on the vehicle, and so forth; allow input of fuel consumption and calculate fuel efficiency; and include a password requirement before some functions can be accessed in order to increase the security of the system. The dates, times of day or odometer readings can be predetermined by the user.

The ROM (50 in FIG. 2) can desirably store programming code to carry out several program sequences which are interactive with the operator of the vehicle. Such program sequences include, for example:

A. A trip record sequence such as that just described. A sample trip sequence is outlined below:
Sensing: Ignition on.
Action: Memory capacity check sequence and display "NO. OF TRIPS LEFT=XXXX" This would be the number of trip data strings which could be placed in RAM until a data transfer and a trip memory reset would be necessary.
Prompt: Audible alarm and display "START MILAGE?"
Input: Operator responds with "xxxxx.x enter"; Trip log odometer responds with a beep; Operator responds "enter".
Prompt: Audible alarm and display "TRIP CODE".
Input: Operator responds "xxxx enter"; Trip log odometer responds with a beep; Operator responds "enter".
Prompt: Audible alarm and display "DRIVER CODE".
Input: Operator responds with "xxxx enter" Trip log odometer responds with a beep; Operator responds "enter".
Action: Store start odometer value first as the end odometer value in conjunction with previous start odometer value and date; Then store start odometer value, and date.
Sensing: Ignition off.
Action: Ready for next start odometer value.
Sensing: Ignition on; trip record sequence complete.

B. A trip record sequence such as that just described. A sample trip sequence is outlined below:
Sensing: Ignition on.
Action: Memory capacity check sequence and display "NO. OF TRIPS LEFT=XXXX" This would be the number of trip data strings which could be placed in RAM until a data transfer and a trip memory reset would be necessary.
Prompt: Audible alarm and display "START MILAGE?"
Input: Operator responds with "xxxxx.x enter"; Trip log odometer responds with a beep; Operator responds "enter".
Prompt: Audible alarm and display "TRIP CODE".
Input: Operator responds "xxxx enter"; Trip log odometer responds with a beep; Operator responds "enter".
Prompt: Audible alarm and display "DRIVER CODE".
Input: Operator responds with "xxxx enter" Trip log odometer responds with a beep; Operator responds "enter".
Action: Calculate previous trip and store trip distance value, store start odometer value, and date.
Sensing: Ignition off.
Action: Ready for next start odometer value.
Sensing: Ignition on; trip record sequence complete.

C. A data transfer and trip memory reset sequence. This sequence is used to transfer the odometer readings stored in memory to a data utilization device such as a general purpose computer via the data I/O port (66 in FIG. 2). This sequence resets a portion of the RAM (56 in FIG. 2) so that new odometer readings can be stored therein. The data output from the trip log odometer can preferably be in ASCII format with commas being used as data delimiters.

D. A memory capacity check sequence. This sequence is desirably run with each trip record sequence. Since there is a limited amount of storage space in the RAM, it is important to ensure that sufficient space exists to store the ensuing trip data strings. In some cases, an operator may only remove the trip log odometer from a vehicle once a year so that memory capacity should be large.

E. An operating options sequence can be included to check the date, starting odometer value, and other parameters.

F. A calibration sequence to match the values used by the trip log odometer with those of the external components such as the existing vehicle speedometer.

G. A trip continue response capability can be included to permit the user to simply extend the previous trip and conserve data strings stored in memory.

Other program sequences can also be used within the scope of the present invention. Particular embodiments of the present invention can be fabricated to best meet the needs of individual applications.

One aspect of the invention is that the odometer 10 produces an audible/visual prompt when the number of trips left to be stored equals a certain, predetermined number, such as one hundred. In this example, when there is only room in the memory for one hundred more trips to be logged, the audible/visual warning is given, preferably accompanied by an explanatory display of text. The particular number of remaining trips which activates the warning can be predetermined and preset at the factory, or the odometer 10 can be configured to allow the operator to determine this number.

It is to be understood that the operator of the vehicle controls whether a trip is logged or not, or whether a trip is continued or not, as explained above. A trip is in an open state if it has not been closed by the entry of an ending odometer reading; otherwise, a trip is in a closed state. When the operator activates the ignition of the vehicle, the vehicle will indicate whether the previously logged trip is in an open or closed state. If an open state exists, the operator may close that trip by entering an ending odometer reading, or do nothing in order to continue the trip. The open state continues until an ending odometer reading is entered. If a closed state exists, the odometer 10 prompts the operator to enter a beginning odometer reading. No trip is logged until the operator enters a beginning odometer reading.

Figure 4A:
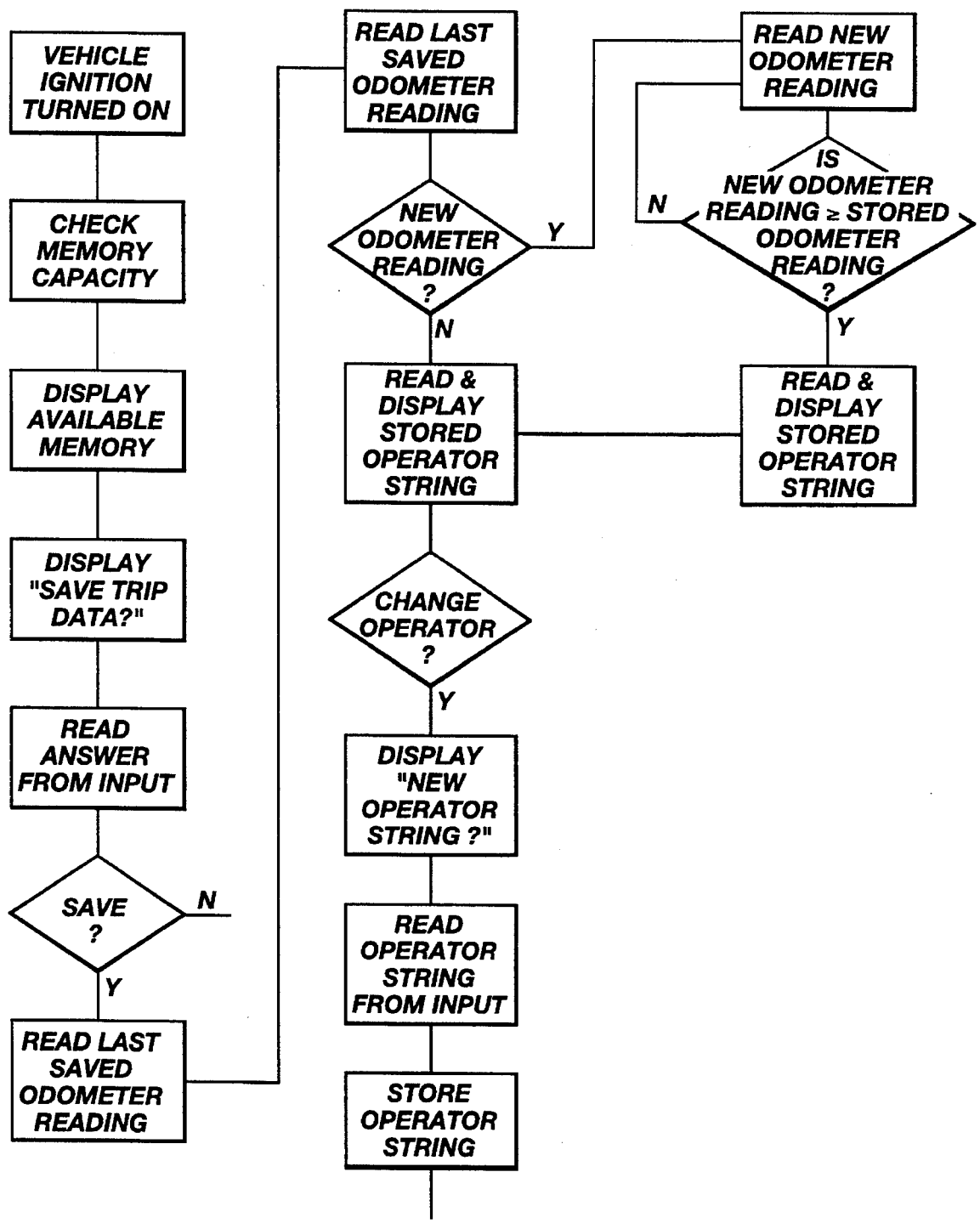
FIGS. 4A and 4B are flow diagrams showing illustrative operational routines according to the present invention.
Figure 4B:
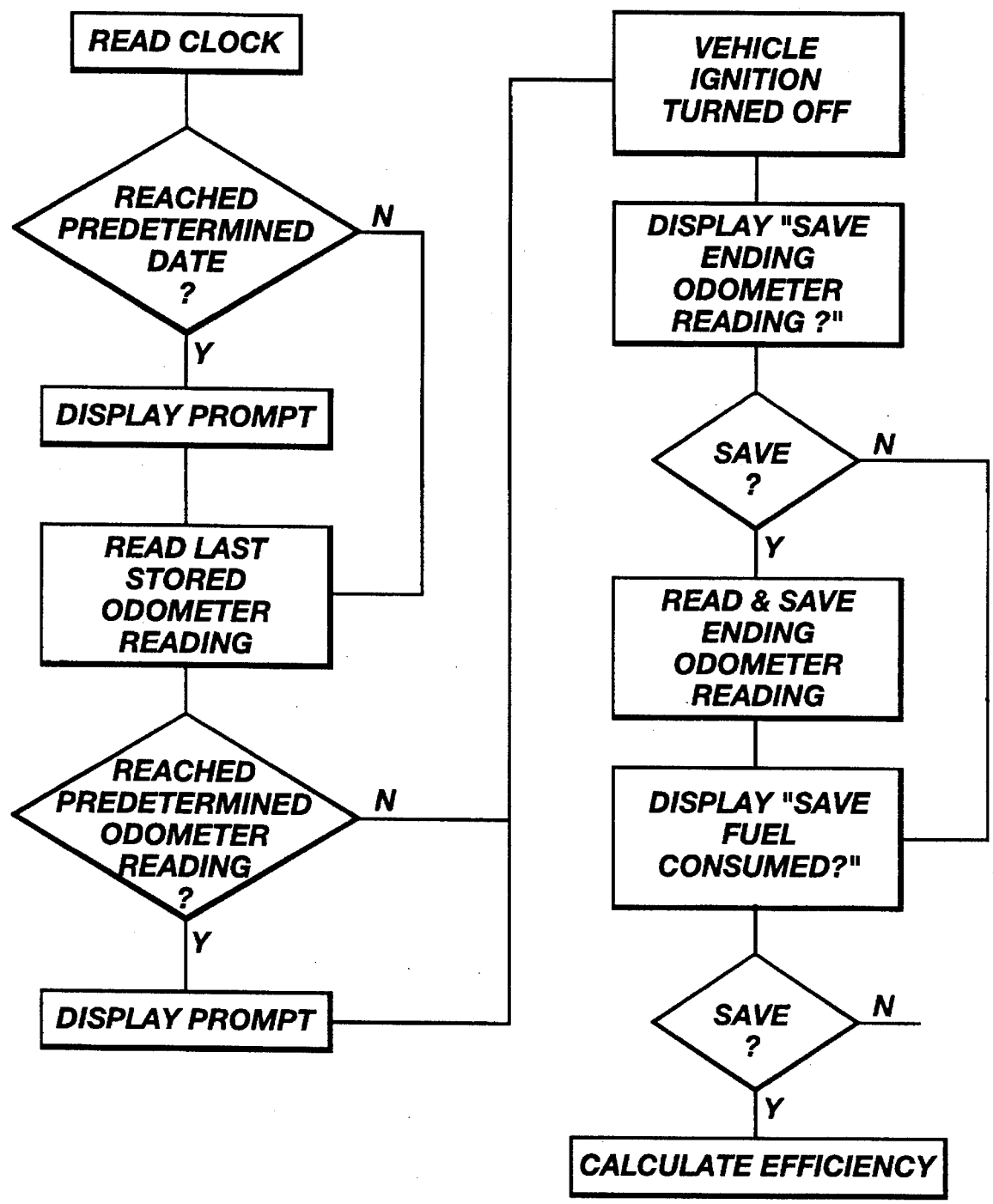

Illustrative flow diagrams according to the present invention are shown in FIGS. 4A and 4B.

In view of the foregoing, it will be appreciated that the present invention provides a system for logging vehicle trips which is more convenient and more accurate than previously available systems or methods. It is capable of manually or automatically logging the beginning and ending odometer readings and/or the distance of each trip made by a vehicle. The present invention also provides a system for logging vehicle trips which prompts the operator to input information to identify the trip and provides a system for logging vehicle trips which can readily transfer the recorded trip log information to another computer in a format where it can be used thereby. The present invention also provides a system for logging vehicle trips which prompts the operator for, and allows convenient input of, codes identifying the operation and/or the purpose of the trip, with each trip logged.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A system for storing data associated with trips having an origination point and a destination point made by a vehicle, the system comprising:

odometer input means manipulable by an operator of the vehicle for receiving a beginning odometer reading and an ending odometer reading for each of a plurality of trips, wherein an operator of the vehicle can selectively cause said input means to receive pairs of odometer readings for certain trips, and to thereby prevent said input means from receiving odometer readings for other trips;

clock means for providing a date which is associated with at least the beginning odometer reading of a trip;

storage means for storing the odometer readings and the associated date;

transfer means for conveying the odometer readings and the associated date to an external data utilizing device;

display means for visually presenting the odometer readings to an operator of the vehicle;

power supply means for providing electrical power to the odometer input means, the storage means, the clock means, the transfer means, and the display means, the power supply means including a self-contained DC power source;

housing means for holding the odometer input means, the storage means, the clock means, the transfer means, the display means, and the power supply means, the housing means also comprising first connection means for connecting at least the power supply means to an external power source;

means for releasably holding the housing means at a position inside an operator's compartment of the vehicle, the means for releasably holding the housing means including means for attaching to the interior of the vehicle in a position accessible by the operator of the vehicle; and second connection means for connecting at least an external DC power source to the first connection means, the second connection means being attached to the means for releasably holding the housing means, such that the apparatus may be powered by an external power source when the housing means is being held in the means for releasably holding and the apparatus can be removed from the vehicle.

2. A system as in claim 1 further comprising means responsive to a signal produced by an input means command for causing the memory device to store numeric input for a second trip.

3. A system as defined in claim 1 wherein the odometer input means comprises a key pad configured to be manipulated by the operator to thereby allow the information from the odometer device to be entered manually into the system.

4. A system as defined in claim 3 wherein the key pad comprises a numeric key pad.

5. A system as defined in claim 1 further comprising means for storing a first operator identification character string with the beginning and ending odometer readings of a trip.

6. A system as defined in claim 5 wherein the means for storing a first operator identification character string further comprises:

manual means for entering and storing the first operator identification character string; and automatic means for entering and storing the first operator identification character string;

wherein the operator can select between the manual means and the automatic means for entering and storing the first operator identification character string.

7. A system as defined in claim 1 further comprising means for storing a first trip purpose identification character string with the beginning and ending odometer readings of a trip.

8. A system as defined in claim 7 wherein the means for storing a first trip purpose identification character string further comprises:

manual means for entering and storing the first trip purpose identification character string; and automatic means for entering and storing the first trip purpose identification character string;

wherein the operator can select between the manual means and the automatic means for entering the first trip purpose identification character string.

9. A system as defined in claim 1 further comprising means for inputting the amount of fuel consumed during the first trip and for calculating a fuel economy for the first trip.

10. A system as defined in claim 1 further comprising calculation means for calculating the distance between a first origination point and a first destination point to derive a first trip distance value.

11. A system as defined in claim 10 wherein the calculation means comprises a microprocessor.

12. A system as defined in claim 1, further including:

means for generating a signal detectable by the operator when a vehicle ignition switch is activated to thereby prompt the operator to enter a command on the touch actuated input means to produce a signal indicating whether a trip is a continuation of a previous trip;

means responsive to a signal produced by a command of the operator for causing the storage means to store a single beginning odometer reading and a single ending odometer reading for a trip comprising a series of intermediate trips.

13. The system of claim 1 further comprising error checking means for comparing a presently entered odometer reading with a previously entered reading and for developing an error indication signal if the presently entered reading has a lower numerical reading than the previously entered reading.

14. The system of claim 1 further comprising means for alerting the operator when the amount of data stored approaches the capacity of the storage means.

15. A system as defined in claim 14 wherein the means for alerting the operator includes means for displaying the number of trips remaining to be stored in the storage means.

16. A system as defined in claim 14 wherein the means for alerting the operator further includes means for displaying the number of trips stored in the storage means.

17. A system as defined in claim 14 wherein the means for alerting the operator further includes signal generating means for providing an signal to the operator when the number of trips remaining to be stored in the storage means equals a predetermined number.

18. The system of claim 1 further comprising signal generating means for providing a signal to the operator upon the occurrence of a predetermined event.

19. A system as in claim 18 wherein the event is the occurence of a predetermined odometer reading.

20. A system as in claim 18 wherein the event is the occurence of a predetermined date.

21. A system for storing data associated with trips having an origination point and a destination point made by a vehicle, the system comprising:

touch actuateable input means for receiving numeric input from a vehicle operator representing the odometer reading of the vehicle at the origination point and the odometer reading of the vehicle at the destination point;

an alarm;

means for triggering the alarm when the vehicle ignition switch is actuated;

a memory device for storing the numeric input;

clock means for associating a date and a time of day with the odometer readings;

a data transfer port configured for conveying the numeric input and the associated date to an external data utilizing device;

a visually readable display configured to present the numeric input to the operator;

means for generating a signal detectable by the operator when the vehicle ignition switch is activated to thereby prompt the operator to enter a command on the touch actuateable input means to produce a signal;

means responsive to a signal produced by an input means command for causing the memory device to store numeric input for a second trip;

means responsive to a signal produced by an input means command for preventing the memory device from storing data for a particular trip;

means responsive to a signal produced by an input means command for causing the memory device to store a single beginning odometer reading and a single ending odometer reading for a trip comprising a series of intermediate trips;

error checking means for comparing a presently entered odometer reading with a previously entered reading and for developing an error indication signal if the presently entered reading has a lower numerical reading than the previously entered reading;

means for alerting the operator when the amount of stored data approaches the capacity of the storage means;

signal generating means for providing an signal to the operator upon of the occurrence of a predetermined odometer reading;

a battery operated power supply configured to provide electrical power to the apparatus;

a connector for receiving DC power;

housing means for holding the touch actuateable input means, the alarm, the means for triggering, the micro computer, the memory device, the clock means, the data transfer port, the visually readable display, and the battery operated power supply;

a cradle configured to releasably hold the housing means at a position inside the operator's compartment of the vehicle, the means for releasably holding the housing means including means for attaching to the interior of the vehicle in a position accessible by the operator of the vehicle; and a connector, providing DC power from the vehicle power source and mounted on the cradle, configured to mate with the connector held by the housing means such that the apparatus may be powered from the vehicle power source and removed from the vehicle for transfer of data contained in the memory device.

22. A system as in claim 21, the touch actuateable input means further comprising:

automatic means for supplying odometer readings associated with the origination point and the destination point of a trip to the storage means for storage;

manual means for supplying odometer readings associated with the origination point and the destination point of a trip to the storage means for storage wherein the operator can select between the automatic and manual means for supplying odometer readings to the storage means for storage; and manually operable data input means for supplying data other than the odometer readings to the storage means for storage.

23. A system as in claim 21 further comprising a micro computer configured for calculating the difference between the odometer reading at the first origination point and the odometer reading at the first destination point to arrive at a first trip distance value.

* * * * *